Dec. 26, 1939.  W. SCHAELCHLIN ET AL  2,184,768

HOISTING CONTROL SYSTEM

Filed Sept. 8, 1938   2 Sheets-Sheet 1

WITNESSES:

INVENTORS
Walter Schoelchlin and
Kurt Mohnke.
BY
Paul E. Friedemann
ATTORNEY

Patented Dec. 26, 1939

2,184,768

UNITED STATES PATENT OFFICE 2,184,768

HOISTING CONTROL SYSTEM

Walter Schaelchlin and Kurt Mahnke, Wilkinsburg, Pa., assignors to Westinghouse Electric & Manufacturing Company, East Pittsburgh, Pa., a corporation of Pennsylvania Application September 8, 1938, Serial No. 228,933

17 Claims. (Cl. 172—179)

Our invention relates to motor control systems, and particularly to systems of control for controlling motors operating hoists such as cargo winches, mining hoists, cranes, etc.

Generally, our invention is intended to provide a maximum degree of flexibility in controlling a motor operating a cargo winch, so that the entire range of speed may be readily kept under control from no-load to full-load both in the hoisting direction and in the lowering direction.

One object of our invention is to provide a system of control for a cargo winch, with provisions for controlling the speed of the hoist for both lowering operation and hoisting operation from a minimum to a maximum speed over a range of load varying from a minimum to a maximum.

Another object of our invention is to provide a system of control for a winch to achieve slow "setting down" speed to avoid the need of "inching" a motor, as was heretofore necessary.

A further object of our invention is to achieve slow lowering speeds at high efficiency.

Another object of our invention is to provide a system embodying novel dynamic braking to achieve better control of low speeds than heretofore possible.

Another object is to provide a system to establish a high starting torque against sluggish equipment or unloaded hook in the lowering direction.

Another object of our invention is to provide a control system that will permit the employment of a novel highly efficient dynamic braking circuit.

Another object of our invention is to provide a control system for a cargo winch, to provide extreme flexibility of operation and so safeguarded that the master controller may be moved suddenly in any direction from any position without danger to the motor and the equipment.

Generally, our invention includes a conventional series motor which operates as a series motor during hoisting and as a shunt motor during lowering, but which motor is provided with special resistor control and has an additional separately excited field winding, the excitation of which is controlled in special relation to the direction of operation of the motor and the load on the motor.

During lowering, as stated, the motor series field is operating as a shunt field and the separately excited field is in effect an additional shunt field. We secure high empty hook speed in the lowering direction for the last or highest speed point by a suitable control of the two field windings. This advantage and the many other advantages will become more apparent from a study of the following specification when taken in conjunction with the drawings, in which.

Figure 1:
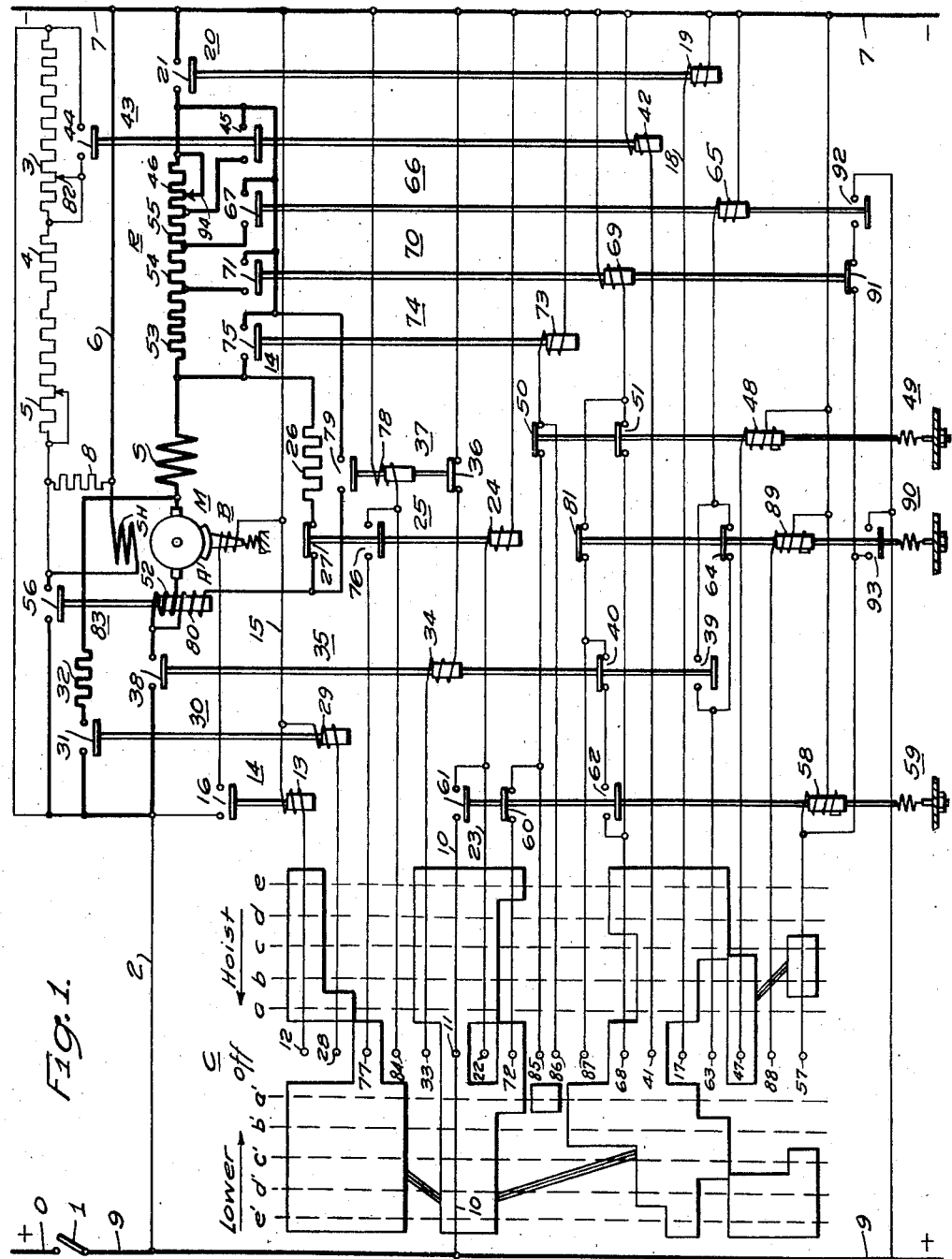
Figure 1 is a circuit diagram of the entire control system including the motor and showing the elements in operative relation.

Referring to Fig. 1, reference characters 0 and 7 designate the positive and negative buses, respectively, of the source of energy and I designates schematically the main switch. M designates the motor for operating the cargo winch. This motor M has a series field winding S, an armature winding A and a shunt field winding SH. The series field winding S, like in prior art devices, is, during lowering, connected as a shunt field winding but unlike prior art devices is provided with a special control coacting with special control for a shunt field SH which control made it possible to use a separate or extra shunt field for securing novel operations, not heretofore possible with cargo winch control.

The control for the two field windings, among other elements, includes the starting resistor R including the resistor sections, a load relay, and a plurality of specially controlled resistor shunting contactors, or relays, 43, 66, 70 and 74, and a master controller C, having five, or more, lowering and five, or more, hoisting positions.

The motor is provided with a dynamic braking resistor so arranged and controlled to effect dynamic braking for overhauling loads, or inertia load at stopping for stopping, that is, when the controller C is in the "off" position, and in first position hoist when handling a light hook load.

A still better understanding of the novel features of our invention can be had from studies of typical operations for both hoisting and lowering. If the attendant wishes to start the motor M, and assuming buses 0 and 7 are energized, he actuates switch I, whereupon a number of energized circuits are established.

One circuit may be traced from 0 through switch I, conductor 2, field control adjustable resistor 3, a fixed resistor 4, rheostat 5, shunt field winding SH, and conductor 6 to the bus 7. The shunt field winding SH, for well known reasons is connected in parallel to a high resistance discharge resistor 8. The field SH is thus fully energized before the motor M is called upon to operate a load.

A circuit is also established from switch 1 through conductors 9 and 10 leading to the contact finger 11, which, as shown, remains energized for all positions of the controller C. Since all the controller segments, but one, are interconnected as shown, the segments may hereinafter be considered positively energized.

Other circuits not shown, as for overload and low voltage protection, and some shown are also established by the operation of switch 1, but, except for one circuit, so far as our invention is concerned have no significance.

First point hoisting

Assuming the attendant wishes to hoist a load and he moves the controller to the first hoisting position. A circuit is immediately established from the controller segments through contact finger 12 through the coil 13 of the brake relay 14 and conductor 15 to the bus 7. Operation of brake relay 14 establishes a circuit for the electromagnetic brake B from conductor 2 through contact members 16, the brake coil to conductor 15. It should be noted from an inspection of the controller that relay 14 is energized for all hoisting and lowering positions. The brake B is thus only set in the "off" position.

Another circuit may be traced from the contact finger 17 through conductor 18, coil 19 of line contactor 20 which thus closes its contact members 21. From an inspection of the controller segments it is clear that contactor 20 is in operated position for all positions of the controller C except for the "off" position.

A further circuit is established from contact finger 22, conductor 23, coil 24 of the dynamic braking-control contactor 25 for the control of the dynamic braking resistor 26 to the bus 7. The dynamic braking control contactor 25 remains energized for all positions of the controller except the "off" position. Since the control contactor 25 opens its contact members 27 the dynamic braking resistor 26 is only used at the same time brake B is used, namely, for an "off" position of the controller but not always when brake B is used. Final stopping when the controller is moved from any operating position to the "off" position is thus very rapidly effected.

Still other circuits are established on the first hoist position. One circuit, only effective for the first hoisting position, may be traced from contact finger 28 through coil 29 of control contactor 30 which closes its contact members 31 to connect the resistor 32 in parallel with the motor armature, as will presently appear.

A circuit is also established from contact finger 33 through coil 34 of series circuit control contactor 35 and contact members 36 of another control contactor 37 to the bus 7. Operation of control contactor 35 causes the closing of contact members 38 and 39 and the opening of contact members 40.

Another circuit may be traced from contact finger 41, energized for all controller positions except the last point lowering, through coil 42 of speed control relay 43 to the bus 7. Speed control relay 43 closes its contact members 44 and 45 to thus shunt adjustable resistors 3 and 46. As long as the load current of the motor M remains fixed below a given value, the shunt field SH will have an adjusted relatively high value for all hoisting and lowering controller positions except the last point lowering.

Contact finger 47 remains energized and a circuit may be traced from this contact finger through coil 48 of adjustable inductive time relay 49 to bus 7. This inductive time relay instantaneously opens its contact members 50 and 51.

From the operations effected by the circuits traced the motor circuit may be traced from conductor 2 through the parallel circuit comprising the contact members 31, resistor 32 in parallel with contact members 38, load relay coil 52 and armature A in series with the series field S, resistor sections 53, 54 and 55 and contact members 45 and 21 to the bus 7.

At the instant the controller is fully in the first hoist position, the motor speed is zero and since the armature resistance is small most of the line current for a loaded motor will pass through the armature. The motor is, of course, loaded when the slack in the chains and the back lash in the gearing has been taken up and the motor actually begins to lift the load. Before the beginning of such actual lifting of the load and the motor runs substantially without load because only the chains, the hook, etc., are being operated with the result that substantially all the line current passes through resistor 32. The motor armature is thus subjected only to the voltage across resistor 32. Resistor 32 being of a relatively low resistance and the resistance being also selected in proper relation to the resistance characteristics of both the armature A and the series field S, the voltage on the motor is relatively low with the result that the motor slowly takes up all back lash in the gearing, picks up the chains, the hook, etc., and slowly and gradually without the slightest jolt picks up the load on the hook.

Since all the starting current passes through the series field the excitation will be heavy. Further, at starting of the load the coil 52 is heavily energized and in consequence contact members 56 are closed to thus shunt all the resistors, as 3, 4 and 5, out of the shunt field circuit with the result that a much heavier field excitation is obtained.

Second point hoist

On this controller position coil 29 is deenergized and contact members 31 are thus opened, removing the shunt around the armature. Contact finger 57 is also energized and a circuit is established from this contact finger through coil 58 of adjustable inductive time limit relay 59 which immediately opens its contact members 60 and closes its contact members 61 and 62.

Third point hoist

On this controller position contact finger 63 is energized and a circuit is established from this contact finger through contact members 39, coil 65 of accelerating contactor 66 to line 7. Operation of contactor 66 closes contact members 67 to thus shunt resistor 55.

Fourth position hoist

On this controller position contact finger 68 is energized and contact finger 57 is deenergized. A circuit is established from the contact finger 68 through contact members 51, coil 69 of accelerating contactor 70.

It should be noted that contact members 50 and 51 only close after a definite time interval, since in moving from the second controller position to the third contact finger 47 and thus coil 48 of the time limit relay 49 are deenergized. The attendant thus cannot damage the equipment by a too rapid movement of the controller. Operation of contactor 70 closes the contact members 71 to thus shunt resistor 54.

Deenergization of contact finger 57 deenergizes time limit relay 59. This relay thus closes its contact members 60, only after a definite time has elapsed.

Fifth point hoist

On this controller position contact finger 72 is energized and a circuit is established from this contact finger through contact members 60 and 50 (if closed by this time), coil 73 of accelerating contactor 74 to lines 7. Operation of contactor 74 closes contact members 75 to shunt resistor 53.

The controller may, for stopping, be moved slowly successively through all the positions in reverse order in which case all the circuits hereinbefore traced are established in reverse order, but the operation usually desired requires that the controller be thrown to the "off" position. The dynamic braking resistance when in the "off" position includes the resistor 26 and since the brake also sets in a very short time, the stopping is effected rapidly.

It should be noted that by our novel arrangement the dynamic braking resistor, contrary to prior art practice, is only in the motor circuit when needed. This alone increases the efficiency of our system over systems of the prior art.

If the hook load is light the motor speed is high on the first point hoist, as the controller is moved from any other hoist position to the "off" position, contact members 31 are closed and a low resistance dynamic braking circuit is established through resistor 32 to thus rapidly stop the hook.

Another important feature, not provided by any prior art hoist control devices, is the provision of a shunt field and a special light hook speed adjusting resistor 3. By adjusting the conductor 82, the light hook speed may be altered at will.

Lowering

Before considering the detailed operations of our control for load lowering, attention is called to the load relay 83. Since the series field S, for lowering, operates as a shunt field, contact members 31 are, as an inspection of controller C shows, closed for all lowering positions and contact members 38 are open for all lowering positions. This means that both coils 52 and 80 are in the armature circuit. This means that the load relay is automatically changed in its calibration for lowering. For lowering, the armature current is normally lower than for hoisting and both coils are thus used.

The other circuits that are the same for all lowering positions as for all hoisting positions need not be again discussed.

First point lowering

In the first lowering position contact fingers 84, 85, 86 and 87 are energized and contact finger 47 is deenergized. A circuit is established from contact finger 84 to energize the coil 78 of control contactor 37 which closes its contact members 79 to establish the armature circuit.

Deenergization of contact finger 47 effects the deenergization of time limit relay 49 which closes its contact members 50 and 51 after a definite time interval.

As shown, contact fingers 85 and 86 are shunted by a controller segment whereupon a circuit is established immediately from contact finger 72 through contact members 60, contact fingers 85 and 86 to coil 73. Contact members 75 are thus immediately closed. Energization of contact finger 87 establishes a circuit from this contact finger through contact members 81 to coil 69. Contact members 71 are thus immediately closed. The series field S thus has no resistor sections of the resistor R in its circuit. The motor is thus heavily excited and if the load is an overhauling load, that is a heavy load, the operation is to slowly lower the load.

With the devices of the prior art, on the first point lowering, the motor armature is connected in series with a dynamic braking resistor directly across the series field. The motor, therefore, upon being subjected to regenerative braking, is called upon to generate a considerable voltage before the necessary braking torque is produced. With our system of control we do not connect the dynamic braking resistor in the armature circuit, but connect the armature directly across the series field. The motor, therefore, when subjected to regenerative action, is required to generate only a comparatively low voltage to provide the necessary braking torque. Further, the load relay 83 insures maximum excitation for the extra field SH. The load may thus be lowered gradually and almost as slowly as desired without the necessity of any inching operation. In short the load can be gently laid down and is not lowered by intermittent short almost free dropping operations as the prior art inching operation provides. This first point lowering, if the load has to be moved down some considerable distance, thus also provides for a very slow desirable starting lowering acceleration.

Second point lowering

On the second controller position contact finger 63 is energized and, as explained for the energization of this contact finger for hoisting, coil 65 is energized and contact members 67 are closed. If the load being lowered is heavy or if the lowering speed is not to rise or if both these conditions obtain the attendant will remain on the first position or at least not move beyond position two.

In the second lowering controller position the contact fingers 72, 85, and 86 are deenergized and accelerating contactor 74 is deenergized and contact members 75 are opened.

Third point lowering

In the third position contact fingers 68 and 87 are deenergized and contact finger 57 is energized. Deenergization of contact fingers 68 and 87 opens the circuit for coil 69 of the accelerating contactor 70. Contact members 71 open to insert an additional resistor, namely resistor 54 in the field circuit.

Energization of contact finger 57 energizes coil 58 of time limit relay 59. This relay thus is set for future time limit operation.

It should be noted that movement of the controller to the third position deenergized coil 69 and that in the second position coil 65 was energized. This means that contact members 91 and 92 are closed. Coil 58 is thus energized independent of any segments on the controller.

Fourth point lowering

In the fourth lowering position contact fingers 47 and 88 are energized and contact finger 63 is deenergized. Energization of contact finger 47 sets time limit relay 49 by the circuit hereinbefore traced. Energization of contact finger 88 establishes a circuit from this contact finger through coil 89 of the time limit relay 90 to the bus 7. This time limit relay closes its contact members 93, establishing an additional circuit for coil 58, and opens its contact members 81 and 64. In this position the circuit for coil 65 is opened at contact fingers 63 and also at contact members 64.

Fifth point lowering

In the fifth lowering position the only additional thing that takes place is the deenergization of contact finger 41. Coil 42 is thus deenergized and in consequence contact members 44 and 45 are opened. The adjustable resistor 46 is inserted in the field S and the adjustable resistor 3 is inserted in shunt field SH. By the proper adjustment of either conductor 82 or 94, or both, the torque may be adjusted as desired.

For an empty hook or for sluggish equipment, or both, or for a loaded hook and sluggish equipment we obtain a good starting torque and high lowering speed with our system.

To secure this high empty hook speed in the lowering direction, we provide the separate shunt with a special additional adjustable resistor 3 which is shunted to decrease the field excitation of this shunt field and we also provide this additional adjustable resistor 46 for the series field winding, operating as a shunt field winding, to also decrease the excitation of that winding. The combined low excitation of the two field windings provides a positive high empty hook speed. Furthermore, the load relay 83 nevertheless protects the motor against excessive speeds in the event that the overhauling load is above a given value. In other words, if the attendant moves the controller to the fifth position for a heavy load, when the low excitation is not needed, the load relay prevents excessive speeds by keeping the excitation of field SH high.

The particular lowering hook speed desired can be obtained by adjustment of conductor 82 or 94, or both.

Stopping a lowering load

The controller may, of course, be slowly moved from the fifth or any other position to the off position but the usual habit is to throw the controller to the "Off" position. First field control contactor 43 shunts resistors 3 and 46. Accelerating contactor 66 will then be energized shunting resistor 55. Thereafter contactor 70 shunts resistor 54, and then still later accelerating contactor 74 shunts resistor 53. We thus provide selective deceleration.

The series field of the motor, during hoisting and when stopping is to be effected, tends to decrease its excitation and no serious sparking results when the dynamic braking resistor is connected across the armature and series field. However, for lowering and when stopping is to be effected the shunt field as well as the series field tend to strengthen the excitation and, in the absence of our special control, serious sparking would result, particularly if stopping is to be effected from a high operating speed. This sparking is prevented by the provision of our timing control just discussed.

Still another important feature that further increases the overall efficiency of motor and control is the use of the shunt field in this type of control and the special control for the shunt field.

The low efficiency of prior art series motor control becomes apparent when the type of control heretofore used for a series motor is considered. In order to control a series motor resort must be had practically entirely to series resistors in the motor series field circuit. In order to develop the necessary lowering speed and lowering torque, especially with an unloaded hook, a relatively large current is required which causes a considerable loss of energy in the series resistors.

With the use of a shunt field as an additional control means and which field has many turns the excitation can be very effectively controlled and the energy dissipated in the motor circuit during lowering becomes very much less. The efficiency of our system of control, particularly for the lowering operation is thus considerably higher, but the overall efficiency is also much higher, since for every lowering operation, a corresponding hoisting operation has to be performed.

Figure 2:
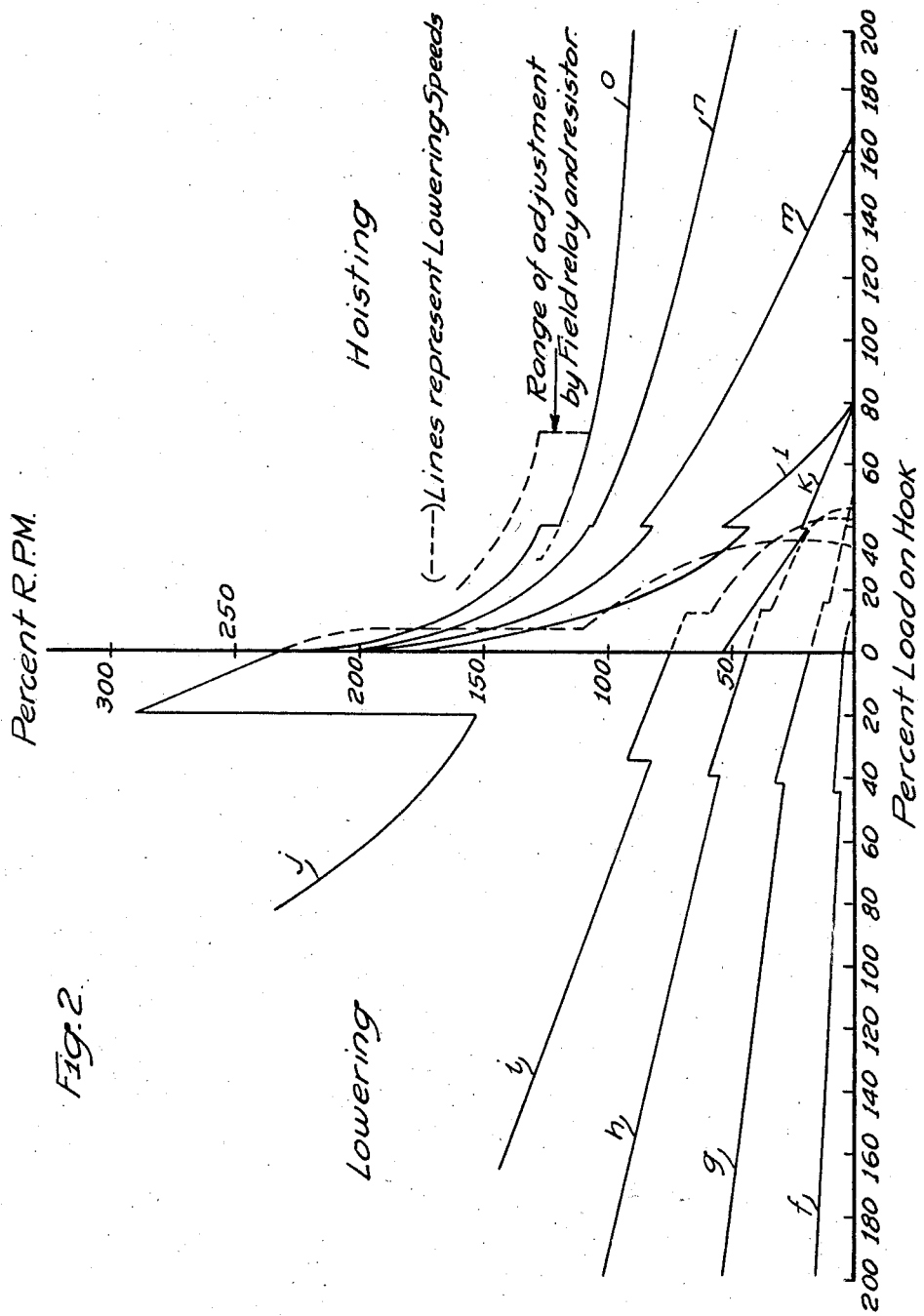
Fig. 2 shows a plurality of curves showing graphically the relationship between the motor speed and the load on the hoist hook, for the various positions of the master controller in the hoisting and the lowering positions.

The curves $f$, $g$, $h$, $i$, $j$, $k$, $l$, $m$, $n$ and $o$ of Fig. 2 show that there is good distribution of the curves for the various hoisting and lowering positions thus eliminating jerking of the load in the process of speeding up or slowing down.

As hereinbefore stated the dynamic braking resistor is only in the circuit when needed. This gives a more even speed as can be seen from the flatness of the curves (see Fig. 2), particularly for the lowering direction. On any lowering point of the controller, the speed will vary less with variations in load than for prior art control schemes due to the absence of the braking resistor from the armature circuit.

We are, of course, aware that others skilled in the art and particularly after having had the benefit of our teachings can devise similar systems of control for accomplishing the novel results herein pointed out. We, therefore, do not wish to be limited to the particular circuits shown and described but wish to be limited only by the pertinent prior art and the claims hereto appended.

We claim as our invention:

1. In a system of control for a direct current motor for operating a hoist as a cargo winch, in combination, a motor, an armature winding and a field winding therefor, means for selectively connecting the field winding either in series with the armature winding or in parallel with the armature winding, a second field winding for the motor connected in shunt relation to both the armature winding and the first field winding regardless of the character of the selective interconnection of the first field winding with the armature winding resistance means, the resistance value of which may be altered, interconnected with said second field winding, and means responsive to the current in the armature winding for altering the resistance value of the resistance to thus automatically control the current value in the second field winding.

2. In a system of control for a direct current motor for operating a hoist, as a cargo winch, in combination, a motor, an armature winding and a field winding therefor, means for selectively interconnecting the armature winding and field winding so that said windings are for one selected interconnection in parallel and for another selected interconnection in series, a load current responsive device operable at one current value for one selected interconnection and operable at another current value for another selected interconnection, and a second field winding for the motor disposed to be controlled by said load current responsive device.

3. In a system of control for a direct current motor for operating a hoist, as a cargo winch, in combination, a direct current motor having an armature winding and a field winding, a master controller adapted for one set of operating conditions to connect the field winding in series with the armature winding and for another operating condition in parallel circuit with the armature winding, an armature current responsive device controlled by said master controller to be responsive to operate at different current values depending upon which set of operating conditions of the master controller is selected, a second field winding for the motor resistance means, the resistance value of which may be altered, interconnected with said second field winding, and means responsive to the operation of the armature current responsive device for altering the resistance value of said resistance means thus to control the excitation of the second field winding.

4. In a system of control for a direct current motor for operating a hoist, as a cargo winch, in combination, a direct current motor, an armature winding and a field winding therefor, a source of direct current energy, selective switching means for connecting said field winding either in series with the armature winding or in shunt relation to the armature, means for connecting the armature winding and field winding to the source of energy, an armature shunt circuit, and means for connecting the armature shunt circuit across the armature when the selective switching means is in such position as to connect the field winding and armature winding in series whereby a low voltage is impressed on the armature winding when the source of energy is connected to the armature winding and field winding.

5. In a system of control for a direct current motor for operating a hoist, as a cargo winch, in combination, a direct current motor having an armature winding and a field winding, a source of direct current energy, selective switching means for connecting said field winding either in series with the armature winding or in shunt relation to the armature, means for connecting the armature winding and field winding to the source of energy, an armature shunt circuit, means for connecting the armature shunt circuit across the armature winding when the selective switching means is in such position as to connect the field winding and armature winding in series whereby a low voltage is impressed on the armature winding when the source of energy is connected to the armature winding and field winding, and means for exciting the field winding a maximum at the time the armature is subjected to a low voltage.

6. In a system of control for a direct current motor for operating a hoist, as a cargo winch, in combination, a direct current motor having an armature winding and a field winding, a source of direct current energy, selective switching means for connecting said field winding either in series with the armature winding or in shunt relation to the armature winding, means for connecting the armature winding and field winding to the source of energy, an armature shunt circuit, means for connecting the armature shunt circuit across the armature winding when the selective switching means is in such position as to connect the field winding and armature winding in series whereby a low voltage is impressed on the armature winding when the source of energy is connected to the armature winding and field winding, means for exciting the field winding a maximum at the time the armature is subjected to a low voltage, and means independent of said field winding for also providing a component of magneto-motive force in the motor at a given current in the armature winding.

7. In a system of control for a direct current motor for operating a hoist, as a cargo winch, in combination, a direct current motor having an armature winding and a field winding, a source of direct current energy, selective switching means for connecting said field winding either in series with the armature winding or in shunt relation to the armature, means for connecting the armature winding and field winding to the source of energy, an armature shunt circuit, means for connecting the armature shunt circuit across the armature winding when the selective switching means is in such position as to connect the field winding and armature winding in series whereby a low voltage is impressed on the armature winding when the source of energy is connected to the armature winding and field winding, means for exciting the field winding a maximum at the time the armature is subjected to a low voltage, means independent of said field winding for also providing a component of magneto-motive force in the motor at a given current in the armature winding, and means for altering the operating characteristic of the last named means as a function of the operation of said selective switching means.

8. In a system of control for a motor operating a hoist, in combination, a direct current motor, said motor having a field winding and an armature winding, a circuit controller adapted for one set of operating conditions to connect said field winding and armature winding in series, and adapted for another set of operating conditions to connect said field winding and armature winding in parallel, a separate field winding for also exciting the motor, and a load current responsive relay for controlling the excitation of the separate field winding.

9. In a system of control for a motor operating a hoist, in combination, a direct current motor, said motor having a field winding and an armature winding, a manually operable circuit controller having a plurality of operating positions for effecting the operation of the motor in one direction, said circuit controller connecting the motor armature winding and field winding in series and, for successive operating positions successively decreasing the resistance in the armature and series connected field winding circuit and a resistor connected in shunt relation to the armature winding on the first operating position of the plurality of operating positions.

10. In a system of control for a motor operating a hoist, in combination, a direct current motor, said motor having a field winding and an armature winding, a manually operable circuit controller having a plurality of operating positions for effecting operation of the motor in one direction, said circuit controller connecting the motor armature winding and field winding in series and for successive operating positions successively decreasing the resistance in the armature and series connected field winding circuit, a separate field for also exciting the motor, and means responsive to the armature current of the motor for controlling the excitation effect of the separate field winding.

11. In a system of control for a motor operating a hoist, in combination, a direct current motor, said motor having a field winding and an armature winding, a manually operable circuit controller having a plurality of operating positions, said circuit controller connecting the motor armature winding and field winding in series and for successive operating positions successively decreasing the resistance in the armature and series connected field winding circuit, a resistor connected in shunt relation to the armature winding on the first operating position of the controller, a separate field for also exciting the motor, and means responsive to the armature current of the motor for controlling the excitation effect of the separate field winding.

12. In a system of control for a motor operating a hoist, in combination, a direct current motor, said motor having a field winding and an armature winding, a manually operable controller having one group of operating positions for connecting the armature winding and field winding in parallel and having another group of operating positions for connecting the armature winding and the field winding in series, a separate field winding connected in shunt relation to the armature winding and first named field winding, and means, operable upon actuation of the controller to its last position of the first group of operating positions, for effecting a decrease of the excitation of both field windings to a minimum.

13. In a system of control for a motor operating a hoist, in combination, a direct current motor, said motor having a field winding and an armature winding, a manually operable controller having one group of operating positions for connecting the armature winding and field winding in parallel and having another group of operating positions for connecting the armature winding and the field winding in series, a separate field winding connected in shunt relation to the armature winding and first named field winding, a load, or armature, current responsive relay for controlling the excitation effect of the separate field winding, and means, operable upon actuation of the controller to its last position of the first group of operating positions, for effecting a decrease of the excitation of both fields windings to a minimum.

14. In a system of control for a motor operating a hoist, in combination, a direct current motor, said motor having a field winding and an armature winding, a manually operable controller having one group of operating positions for connecting the armature winding and field winding in parallel and having another group of operating positions for connecting the armature winding and the field winding in series, a separate field winding connected in shunt relation to the armature winding and first named field winding, means, operable upon actuation of the controller to its last position of the first group of operating positions, for decreasing the excitation of both field windings to a minimum, and means for adjusting such minimum excitation to which the excitation of both field windings is decreased.

15. In a system of control for a motor operating a hoist, in combination, a direct current motor, said motor having a field winding and an armature winding, a manually operable controller having one group of operating positions for connecting the armature winding and field winding in parallel and having another group of operating positions for connecting the armature winding and the field winding in series, a separate field winding connected in shunt relation to the armature winding and first named field winding, a load, or armature, current responsive relay for controlling the excitation effect of the separate field winding, means, operable upon actuation of the controller to its last position of the first group of operating positions, for effecting a decrease of the excitation of both field windings to a minimum, and means for adjusting such minimum excitation to which the excitation of both field windings is decreased.

16. In a system of control for a motor operating a hoist, in combination, a direct current motor, said motor having a field winding and an armature winding, a circuit controller for connecting said field winding and armature winding in series for one set of operating conditions, and for connecting said field winding and armature winding in parallel for another set of operating conditions, a separate field winding for also exciting the motor, and a load current responsive relay for controlling the excitation effect of the separate field winding, means for shunting the motor armature to provide a low voltage on the armature and means for simultaneously heavily exciting both field windings to thus provide a slow motor speed and heavy starting torque.

17. In a system of control for a motor operating a hoist, in combination, a direct current motor, said motor having a field winding and an armature winding, means for connecting the armature winding directly in parallel to the field winding whereby a large braking torque is developed by the motor when subject to regenerative action, a dynamic braking resistor connected to the armature winding only when the armature winding is not energized from a source of energy.

WALTER SCHAELCHLIN.
KURT MAHNKE.